United States Patent Office 3,215,672
Patented Nov. 2, 1965

3,215,672
POLYMERIZATION OF UNSATURATED MONOMERS WITH CATALYSTS OF NEUTRAL METAL HALIDE SALTS
Alva T. Stewart, Berkeley, Calif., and Rudolph F. Fischer, Dobbs Ferry, N.Y., assignors to Shell Oil Company, New York, N.Y., a corporation of Delaware
No Drawing. Filed June 17, 1960, Ser. No. 36,722
10 Claims. (Cl. 260—67)

This invention relates to a process for polymerizing ethylenically unsaturated monomers to form fusible polymers and to the utilization of these polymers, particularly in the preparation of valuable derivatives.

Specifically, the invention provides a new and efficient process for polymerizing ethylenically unsaturated monomers, and particularly alpha,beta-ethylenically unsaturated aldehydes, to form fusible polymers. This process comprises contacting the unsaturated monomer with a catalytic amount of a neutral salt of a halogen acid, such as, for example, sodium chloride, in the presence of water.

The invention further provides methods for converting many of the resulting fusible polymers prepared by the above-described process into other valuable derivatives, such as polyhydric alcohols, polyamines, polymercaptals, and the like.

It is an object of the invention to provide a method for polymerizing unsaturated monomers. It is a further object to provide a method for polymerizing unsaturated monomers to form fusible polymers which may be easily converted to valuable derivatives. It is a further object to provide a new method for polymerizing alpha,beta-ethylenically unsaturated aldehydes to form fusible polyaldehydes which may be hydrogenated to form polyols. It is a further object to provide a new efficient method for polymerizing unsaturated aldehydes to form polyaldehydes which are useful materials for the preparation of coating and surfacing compositions. It is a further object to provide a method for polymerizing unsaturated aldehydes to form polymeric aldehydes which may be converted to polyamines and polymercaptals. These and other objects of the invention will be apparent from the following detailed description thereof.

It has now been discovered that these and other objects may be accomplished by the new process of the invention which comprises contacting the unsaturated monomer, and preferably an unsaturated aldehyde, with a catalytic amount of a neutral salt of a halogen acid, such as, for example, sodium chloride, in the presence of water. It has been found that when the monomer is contacted with these special salts in the presence of water the monomer is converted to a fusible polymer. In case of the unsaturated aldehyde, the resulting polymers have free aldehyde groups which may be further reacted with amines, mercaptans, and the like to form polymeric polyhydric alcohols, may be oxidized to form polymeric acids, and may be reacted with formaldehyde to give methylol products.

It was surprising to find that this particular group of salts would react catalytically with the unsaturated monomers as they are substantially neutral and are not known to have catalytic activity in the polymerization field.

The monomers to be polymerized by the above process include the ethylenically unsaturated monomers, i.e., those containing at least one >C=C< group. The monomers may be aliphatic, cycloaliphatic, aromatic or heterocyclic and may be monounsaturated or polyunsaturated. Examples of the monomers include, among others, those possessing a plurality of double bonds, such as butadiene, isoprene, methylpentadiene, chloroprene and the like, and the monoethylenically unsaturated compounds and preferably those containing a $CH_2=C<$ group, such as styrene, alpha-methylstyrene, ethyl acrylate, butyl acrylate, methyl methacrylate, vinyl chloride, vinylidene chloride, acrylonitrile, methacrylonitrile, vinyl acetate, allyl acetate, vinyl benzoate, ethylene glycol monoacrylate, vinyl ethyl ether, vinyl ethyl ketone, isoprenyl ethyl ketone and the like, and mixtures thereof.

The preferred monomers to be employed include the alpha,beta-ethylenically unsaturated aldehydes, i.e., aldehydes having an ethylenic group between two carbon atoms one of which is attached to an aldehyde

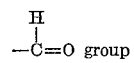

group

The aldehydes may be straight chain or cyclic in character and may or may not contain one or more aromatic constituents. The most desirable aldehydes for the purpose of the present invention have a terminal methylene group attached directly by a double bond to a carbon atom which, in turn, is attached directly to an aldehyde group, as represented by the general formula

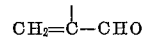

In general, aldehydes useful in the process of the invention have not more than about 10 carbon atoms in the molecule. Examples of suitable alpha,beta-unsaturated aldehydes having a terminal methylene group, are acrolein, alpha-methyl acrolein, alpha-ethyl acrolein, alpha-propyl acrolein, alpha-isobutyl acrolein, alpha-n-amyl acrolein, alpha-n-hexyl acrolein, alpha-bromo acrolein, etc. Examples of other alpha,beta unsaturated aldehydes that may be used include, among others, crotonaldehyde, alpha-chlorocrotonaldehyde, beta-chlorocrotonaldehyde, alpha-bromo-crotonaldehyde, beta-bromo-crotonaldehyde, alpha,gamma-dichlorocrotonaldehyde, alpha,beta-dimethyl acrolein, alpha-methyl-beta-ethylacrolein, alpha-methyl-beta-isopropyl acrolein, alpha-ethyl-beta-propyl acrolein, and the like. Particularly preferred are the 2-alkenals containing no more than 8 carbon atoms.

Catalysts to be employed in the reaction include the neutral salts of halogen acids, such as, for example, sodium chloride, lithium chloride, potassium chloride, sodium bromide, sodium iodide, sodium fluoride, cobaltous chloride, nickelous chloride, and the like, and mixtures thereof. Particularly preferred salts to be employed are the alkali metal halides, such as, for example, sodium, potassium, and lithium chlorides, bromides, iodides, and fluorides.

The amount of the catalyst employed in the polymerization may vary over a considerable range. The catalytic amount employed may be as low as 0.5% to as high as 55% or higher of the weight of the monomer being polymerized. In most cases, however, the amount of catalyst will vary from about 1% to 45% of the amount of monomer being polymerized.

Water is also present in the reaction mixture. The amount of water employed may vary over a wide range. Amounts of water as small as 0.01% by weight are generally sufficient to effect the reaction. Preferred amounts of water range from about 0.5% to 300% by weight. The preferred method of operation is to conduct the reaction in an aqueous medium where the amount of water employed may be as high as practical for economic operation.

The polymerization may be carried out by merely mixing the catalyst with the monomer and water at room temperature. Under these conditions, an exotherm usually occurs and the temperature may go up to 50° C. or 60° C. When mixed under these conditions, it is preferred to let the reaction exotherm without the application of cooling means. In general, temperatures employed may vary from the freezing point of the mixture to 25° C.

As noted, it is preferred to conduct the polymerization in a liquid medium. While it is generally desirable to employ an aqueous medium, it is possible as shown in the examples hereinafter to conduct the reaction in other solvent or liquid media, such as in the presence of tetrahydrofurane, alcohols, esters, and the like.

The amount of monomer employed in the reaction medium may vary over a wide range. It is generally preferred to have the concentration of monomer vary from about 10% to 60% by weight of the liquid medium employed.

After the polymerization has been completed, the polymeric aldehydes may be recovered from the reaction mixture by any suitable means, such as filtration, extraction, and the like, and the catalyst removed by washing with water or other suitable solvents.

The polymers prepared by the above-described process will generally vary from thick liquids to white solids. They will have molecular weights varying from about 300 to as high or higher than 100,000. These molecular weights are determined ebullioscopically in solvents for the polymer. The polymers will be soluble in various solvents depending upon their molecular weight. The lower molecular weight polymers will be soluble in acetone, alcohols and the like. The higher molecular weight polymers, on the other hand, will be soluble in the active solvents, such as ethylene chlorohydrin, sodium bisulfite solutions and the like. The new polymers are also fusible, i.e., they melt on the application of heat. The melting point of the polymers generally range from about 75° C. up to 170° C. and higher.

The polymers of the invention may be utilized in a variety of important applications. They may be used for preparation of castings, moldings, coating compositions and the like. They may be combined with other resins, such as urea and thiourea resin to form resins useful in the formation of film forming materials. They may be also employed as cross-linking agents or modifiers for various resinous compositions.

The polymers such as the aldehyde polymers are particularly useful in the preparation of valuable derivatives. They may be hydrogenated, for example, to form valuable polymeric polyhydric alcohols. The hydrogenation of the polymeric aldehydes is preferably accomplished by treating the polymer with hydrogen at a temperature between about 20° C. and 300° C. and a pressure of about 25 p.s.i. to 2,000 p.s.i. in the presence of a hydrogenation catalyst.

The hydrogenation may be accomplished in the presence or absence of added diluents or solvents. In some cases, it may be desirable to employ solvents, which are relatively inert to the hydrogenation reaction, such as ethanol, isopropanol, ethylene glycol, dioxane, and the like, and mixtures thereof, to facilitate operation of the process.

Catalysts that are used in the hydrogenation are preferably the metals of groups I, II, and IV to VIII of the Periodic Table of Elements, their alloys and derivatives, such as their sulfides, oxides, and chromites. Examples of such catalysts include silver, copper, iron, manganese, molybdenum, nickel, palladium, platinum, chromium, cobalt, rhodium, tungsten, mixtures of the metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon, or the like, and the reaction mixture contacted therewith as by flowing the mixture over or through a bed of the catalyst or according to other methods known in the art.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 5% to 10% by weight. The above-noted preferred catalysts are generally employed in amounts from 5% to 10% by weight.

Temperatures used during the hydrogenation will be at least above 20° C. and generally not in excess of 300° C. Preferred temperatures range from 75° C. to 150° C. Hydrogen pressures of 25 pounds per square inch are effective, but higher pressures of the order of about 500 to 3000 p.s.i. are generally more preferred. Particularly preferred hydrogen pressures range from about 500 p.s.i. to 2000 p.s.i.

The hydrogenation may be executed in any suitable manner and in any suitable apparatus of the type that is customarily employed for hydrogenation processes. A method of carrying out the process that has been found to be advantageous comprises placing the polymer, solvent and catalyst in a pressure-resistant vessel equipped with the necessary inlets and outlets, heating means, pressure gauge, thermometer, etc., and desirably with means for agitating the contents, and subjecting the resulting mixtures to the action of hydrogen gas under the aforedescribed conditions of temperature and pressure in the presence of the catalyst until absorption of hydrogen is for practical purposes complete.

At the completion of the hydrogenation, the polymeric alcohol may be recovered from the reaction mixture by any suitable manner. For example, the hydrogenation catalyst, if dispersed in the reaction mixture, may be recovered by filtration, centrifugation, etc. The desired polymeric alcohol may be recovered and purified by any suitable means, such as high vacuum distillation, solvent extraction, and the like.

The polymeric polyhydric alcohols produced by the hydrogenation of the polymeric aldehydes are useful for a great many important applications. They are useful, for example, as sizing materials for textiles, as greaseproofing agents, impregnating agents for paper and electroplating additives and the like. They are also useful as chemical intermediates in the preparation of other valuable materials. They may be reacted with aldehydes, for example, to form resinous acetals, with nitric acid to form nitrate explosives, and with unsaturated acids to form drying oils.

The polymeric polyhydric alcohols are particularly useful as chemical intermediates in the formation of polyesters for use as plasticizers and as components for surface coating compositions. To prepare these derivatives, one heats the polymeric polyhydric alcohol with a polybasic acid or anhydride alone or with modifying agents, such as non-drying or drying oil fatty acids, preferably in an inert atmosphere. The polyesters prepared in this manner with the non-drying and drying oil fatty acids are particularly useful as additives for baking enamels containing urea and melamine-formaldehyde resins.

The polymeric polycarboxylic acids obtained by oxidizing the new polyaldehydes with oxygen, or other oxidizing agents, may be reacted with alcohols to form valuable esters or may be neutralized with ammonia or other alkaline materials to form products which are useful as polyelectrolytes, soil conditioners, textile treating material and the like.

The new polymeric aldehydes may also be reacted with phenols or with urea or melamine to give resinous products. They may also be reacted with formaldehyde to give poly(methylol) derivatives which are useful in formation of resins and plastics.

To illustrate the manner in which the invention may be carried out, the following examples are given. It is to be understood, however, that the examples are for the purpose of illustration and the invention is not to be regarded as limited to any of the specific materials or conditions recited therein. Unless otherwise specified, parts disclosed in the examples are parts by weight.

*Example I*

This reaction illustrates the polymerizing of acrolein using a saturated solution of sodium chloride.

A reaction vessel equipped with thermometer and stirrer is charged with 300 parts of a saturated water solution of sodium chloride and 80 parts of acrolein. The reaction started at room temperature and the temperature grows to about 50° C. over a period of a few hours. At the end of six hours, a quantitative yield of polymer had been obtained. The resulting product was a solid polymer having a melting point of about 120 to 127° C. and had the following analysis: carbonyl value, 0.52 equivalent per 100 grams; ester value 0.373; acid value .004; and unsaturation .21.

The resulting polymer is used with thiourea in tetrahydrofurane to form a film forming material which could be used to crosslink coatings.

A portion of the resulting polymer is then added to ethanol and treated with hydrogen at 125–135° C. and 100 p.s.i. pressure in the presence of Raney nickel. The reaction was continued until the theoretical amount of hydrogen was absorbed. The mixture is then removed from the hydrogenation vessel, filtered and then topped at 150° C. and 1 millimeter to give a viscous liquid having an OH value of about 0.7 eq./100 g.

The above described polyhydric alcohol is then reacted with equivalent amounts of phthalic anhydride and 50% by weight of coconut fatty acids to form an alkyd resin that can be combined with urea formaldehyde resins to form improved baking enamels.

The above preparation process was repeated using ¼ and ½ saturated NaCl solutions during preparation of the polymer. Related results are obtained.

*Example II*

This example illustrates the polymerization of acrolein using lithium chloride.

100 parts of tetrahydrofurane was added to a reaction vessel equipped with thermometer and stirrer and to this mixture was added two parts of lithium chloride and 80 parts of acrolein containing 1% water. The reaction mixture was kept at a temperature between 20 and 35° C. At the end of 24 hours, a quantitative yield of polymer was obtained.

The resulting mixture was distilled to leave a white solid having a melting point of 125 to 140° C.

The resulting product is hydrogenated as shown in Example I to form a polyol useful in the preparation of alkyd resins.

*Example III*

This example illustrates the polymerization of acrolein using a sodium bromide.

300 parts of a saturated solution of sodium bromide was added to a reaction vessel equipped with stirrer and thermometer and 80 parts of acrolein added thereto. The addition was made at room temperature and the temperature of the vessel gradually raised to 40° C. At the end of 24 hours, a quantitative yield of polymer was obtained. The mixture was filtered to recover a white solid polymer having a melting point of 95 to 105° C.

The resulting polymer is added to ethanol and hydrogenated as shown in Example I to form a soluble polyol useful in the preparation of polyols which may be used to make valuable alkyd coating compositions.

*Example IV*

Example III was repeated with the exception that sodium iodide was used in place of the sodium bromide. The resulting polymer was a white solid having a melting point of 160–165° C.

*Example V*

Example III was repeated with the exception that the sodium bromide was replaced with sodium fluoride. The resulting product was a solid low molecular weight polymer which could be hydrogenated to form a soluble polyol as in Example I.

*Example VI*

Example I was repeated with the exception that the sodium chloride was replaced by potassium chloride. The resulting product was a white solid polymer having a melting point of 95 to 105° C.

*Example VII*

Example I was repeated with the exception that the sodium chloride was replaced by nickelous chloride. The resulting product was a white solid polymer having a melting point of 83 to 90° C.

*Example VIII*

A polymercaptal is prepared from the polymer produced in Example I by dissolving 25 parts of the polymer in 100 parts of dioxane and mixing this solution with 15 parts of ethyl mercaptan. Hydrogen chloride gas bubbled into the solution as the mercaptal-forming catalyst, and the treated solution allowed to stand at room temperature of 20–25° C. for several days. The mixture is then distilled to yield a solid polymercaptal resin.

*Example IX*

To a solution of 3 parts of the polymer produced in Example I dissolved in 100 parts of dioxane is added a solution of 0.5 part of sodium hydroxide in 5 parts of water and 10 parts of powdered silver oxide. The mixture is stirred and warmed to about 70° C. and then allowed to stand for several hours. The excess silver oxide is next removed by filtration and the filtrate is acidified with hydrochloric acid. The resulting polycarboxylic acid resin is isolated by precipitation in water and then washed and dried. The resulting product is a solid polycarboxylic acid resin.

*Example X*

50 parts of ethyl acrylate were added to 150 parts of a saturated sodium chloride water solution and the mixture stirred at room temperature for 24 hours. At the end of that time, the mixture was diluted with water, extracted with ether and stripped of the ether and unreacted monomer. A polymer of ethyl acrylate was obtained.

*Example XI*

Example X was repeated with the exception that lithium chloride was used as the neutral salt. Related results were obtained.

*Example XII*

50 parts of styrene is added to 150 parts of a saturated solution of lithium chloride and the mixture heated at 50–70° C. for several hours. The unreacted styrene and water is removed leaving polystyrene.

*Example XIII*

The preceding example is repeated using butadiene as the monomer. A fusible polybutadiene is obtained.

We claim as our invention:

1. A process for polymerizing an alpha, beta-ethylenically unsaturated aldehyde containing no more than 8 carbon atoms to form a fusible polymer thereof consisting essentially of contacting the unsaturated aldehyde with from 0.5% to 60% by weight of a neutral metal halide salt as the sole catalyst in the presence of water at a temperature from above the freezing point of the mixture to no greater than 60° C.

2. A process as in claim 1 wherein the catalyst is sodium chloride.

3. A process as in claim 1 wherein the catalyst is lithium chloride.

4. A process as in claim 1 wherein the catalyst is potassium chloride.

5. A process for polymerizing alpha,beta-ethylenically unsaturated aldehyde containing no more than 8 carbon atoms to form polymers thereof which may be hydrogenated to form polymeric polyols which consists essentially of contacting the ethylenically unsaturated aldehyde with from 0.5% to 60% by weight of an alkali metal halide salt as the sole catalyst in the presence of water at a temperature from above the freezing point of the mixture to no greater than 60° C. for up to about 6 hours.

6. A process as in claim 5 wherein the polymerization is conducted in the presence of .01% to 300% by weight of water.

7. A process as in claim 5 wherein the amount of the metal salt varies from 1% to 60% by weight of the unsaturated aldehyde.

8. A process as in claim 5 wherein the reaction is conducted at a temperature between 15 and 60° C.

9. A process as in claim 5 wherein the unsaturated aldehyde is acrolein.

10. A process as in claim 5 wherein the unsaturated aldehyde is methacrolein.

References Cited by the Examiner
UNITED STATES PATENTS

| | | | |
|---|---|---|---|
| 2,031,987 | 2/36 | Sullivan | 260—700 |
| 2,142,980 | 1/39 | Huijser et al. | 260—82 |
| 2,356,767 | 8/44 | Kropa | 260—67 |
| 2,809,185 | 10/57 | Hearne et al. | 260—67 |
| 2,819,252 | 1/58 | Shokal | 260—67 |
| 3,079,357 | 2/63 | Fischer | 260—67 |

FOREIGN PATENTS 14,281  19/10  Great Britain.

OTHER REFERENCES

Ito et al., Chemical Abstracts, 49 (1955), p. 14375c–g.

Krczil Kurzes, Handbuch der Polymerisationstechnik, vol. I, published by Akademische Verlagsgesellschaft Becker & Erler Kom.-Ges., Leipzig, 1940, pages 9 and 556 relied on.

WILLIAM H. SHORT, *Primary Examiner.*

MILTON STERMAN, HAROLD N. BURSTEIN,
*Examiners.*